(12) United States Patent
Hall

(10) Patent No.: US 10,002,039 B2
(45) Date of Patent: Jun. 19, 2018

(54) PREDICTING THE RELIABILITY OF LARGE SCALE STORAGE SYSTEMS

(71) Applicant: AT&T Intellectual Property I, L.P., Atlanta, GA (US)

(72) Inventor: Robert J. Hall, Berkeley Heights, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 138 days.

(21) Appl. No.: 14/926,369

(22) Filed: Oct. 29, 2015

(65) Prior Publication Data

US 2017/0123883 A1    May 4, 2017

(51) Int. Cl.
*G06F 11/07*    (2006.01)

(52) U.S. Cl.
CPC ........ *G06F 11/0754* (2013.01); *G06F 11/079* (2013.01); *G06F 11/0727* (2013.01); *G06F 11/0787* (2013.01)

(58) Field of Classification Search
CPC .......................... G06F 11/261; G06F 11/0727
See application file for complete search history.

(56) References Cited

U.S. PATENT DOCUMENTS

| 5,077,736 A * | 12/1991 | Dunphy, Jr. ........ G06F 11/1008 360/903 |
| 5,913,035 A | 6/1999 | Waters et al. |
| 7,292,969 B1 * | 11/2007 | Aharoni ............. G06F 11/3419 703/21 |
| 7,356,452 B1 * | 4/2008 | Naamad ............. G06F 11/3433 703/21 |
| 7,426,554 B2 | 9/2008 | Kennedy |
| 7,502,964 B2 | 3/2009 | Del et al. |
| 8,447,569 B1 | 5/2013 | Marwah et al. |
| 8,661,130 B2 | 2/2014 | Sonoda et al. |
| 8,706,914 B2 | 4/2014 | Duchesneau |
| 8,706,915 B2 | 4/2014 | Duchesneau |

(Continued)

FOREIGN PATENT DOCUMENTS

| CN | 2894106 Y | 4/2007 |
| CN | 202661863 U | 1/2013 |

(Continued)

*Primary Examiner* — Yolanda L Wilson
(74) *Attorney, Agent, or Firm* — Cantor Colburn LLP

(57) ABSTRACT

An aspect includes identifying a set of components of a storage system and determining dependencies among constituent components in the set of components. At least one of the components' ability to function is dependent on at least one other of the components' ability to function. The set of components includes at least one data storage component and at least one computation component configured to operate within at least one datacenter. An aspect also includes identifying a size, strength, and storage placement scheme of the storage system; simulating operation of the storage system based on the identified size, strength, and storage placement scheme; and determining a mean time between loss event from the simulated operation. The mean time between loss event factors in the dependencies among the constituent components. An aspect further includes assessing reliability of the storage system as a function of the mean time between loss event.

20 Claims, 11 Drawing Sheets

(56) References Cited

U.S. PATENT DOCUMENTS

| | | | |
|---|---|---|---|
| 8,768,742 B2 | 7/2014 | Ghosh et al. | |
| 8,862,948 B1 | 10/2014 | Lam | |
| 8,880,801 B1* | 11/2014 | Robins | G06F 12/0246 |
| | | | 711/114 |
| 9,292,533 B2* | 3/2016 | Dawkins | G06F 17/30159 |
| 2002/0019870 A1 | 2/2002 | Chirashnya et al. | |
| 2004/0030826 A1* | 2/2004 | Knapp, III | G06F 11/2094 |
| | | | 711/112 |
| 2004/0260993 A1* | 12/2004 | Griffin | G06F 11/3414 |
| | | | 714/743 |
| 2006/0020628 A1* | 1/2006 | Huberman | G06Q 10/06 |
| 2007/0101202 A1 | 5/2007 | Garbow | |
| 2007/0250302 A1* | 10/2007 | Xu | G06F 11/261 |
| | | | 703/20 |
| 2009/0281782 A1* | 11/2009 | Bitar | G06F 11/3409 |
| | | | 703/21 |
| 2009/0281783 A1* | 11/2009 | Bitar | G06F 11/3457 |
| | | | 703/21 |
| 2010/0125767 A1* | 5/2010 | Zeng | G11C 29/52 |
| | | | 714/723 |
| 2010/0185899 A1* | 7/2010 | Chen | G06F 11/2221 |
| | | | 714/42 |
| 2010/0313072 A1 | 12/2010 | Suffern | |
| 2010/0333089 A1 | 12/2010 | Talwar et al. | |
| 2011/0082837 A1* | 4/2011 | Cherkasova | G06F 11/1461 |
| | | | 707/654 |
| 2012/0011590 A1 | 1/2012 | Donovan | |
| 2012/0079325 A1* | 3/2012 | Riegel | G06F 11/1458 |
| | | | 714/38.1 |
| 2012/0150925 A1 | 6/2012 | Gupta et al. | |
| 2013/0067582 A1 | 3/2013 | Donovan et al. | |
| 2013/0339204 A1 | 12/2013 | Dias et al. | |
| 2013/0339515 A1 | 12/2013 | Radhakrishnan | |
| 2014/0068329 A1 | 3/2014 | Hopper et al. | |
| 2014/0136380 A1 | 5/2014 | Chang et al. | |
| 2014/0281741 A1 | 9/2014 | Bohacek | |
| 2016/0011939 A1* | 1/2016 | Luby | G06F 11/1076 |
| | | | 714/764 |

FOREIGN PATENT DOCUMENTS

| | | |
|---|---|---|
| CN | 103676867 A | 3/2014 |
| CN | 103684817 A | 3/2014 |
| WO | 2013019185 A1 | 2/2013 |

\* cited by examiner

| S | $A_S$ | S (6,3,1080) $z=10$ | |
|---|---|---|---|
| | | A | PO |
| PARTITIONED (PSS) | $\dfrac{d}{p+s}\dbinom{p+s}{s+1}$ | 1.5e4 | 1.0 |
| COPYSET (Z) | $z\dfrac{d}{p+s}\dbinom{p+s}{s+1}$ | 1.5e5 | 1.0 |
| LIMITEDSPREAD (Z) | $d\dbinom{z}{s}$ | 1.3e5 | 1.0 |
| RACKWARE (Z) | $d(z-1)\dbinom{d/z}{s}$ | 2.0e9 | 0.95 |
| SPREAD (SSS) | $\dbinom{d}{s+1}$ | 5.6e10 | 1.0 |

FIG. 3

PREDICTING THE RELIABILITY OF LARGE SCALE STORAGE SYSTEMS

BACKGROUND

Data intensive applications require extreme scaling of their underlying storage systems. Such scaling, together with the fact that many storage systems are implemented in actual data centers, increases the risk of data loss from failures of underlying storage components. Accurate engineering requires quantitatively predicting reliability, but this remains challenging, due to the need to account for extreme scale, redundancy scheme type and strength, and distribution architecture, as well as component dependencies and failure and repair rates.

While no storage system can be completely invulnerable to loss, well known design techniques, including replication and erasure codes, can reduce the probability of loss over a fixed period to a level small enough to be compensated for by other techniques, such as archival or cold storage, recomputation, or insurance. However, a key to engineering this approach is to have a method of quantitatively predicting the reliability of a given large storage system both theoretically and as it is implemented in physical data centers. This knowledge would help in determining which erasure code strength to deploy, a decision that can have significant economic consequences.

A key characteristic of large storage systems is dependency, which has been known to be a dominant factor in their reliability. Data can be lost if a drive fails, but data can also be effectively lost if a host, rack, or data center necessary for accessing the drive go down. Moreover, when a rack goes down it may not only cause many drives to become inaccessible at once, but it is typical that the sudden loss of power may cause permanent damage. Individual storage system components may obey complex stateful failure models, such as Weibull distributions, while others may be well modeled by simple stateless failure models. Thus, modeling detailed hardware dependencies is important to calculating the reliability of the storage system.

In addition to the impact dependency has on the reliability of hardware elements, dependencies can also affect the system at the software level. For example, in a partitioned placement scheme, such as one consisting of two separate RAID arrays, the partitions will fail independently at the software level, and so the aggregate reliability is straight forward to compute (it is inversely proportional to capacity). By contrast, a spread-placed redundant storage system, such as a Hadoop Filesystem (HDFS) or a Quantcast FileSystem (QFS), places file shares randomly across all the drives, with different files placed on different sets of drives. While each file is individually a k-out-of-n system, their aggregate reliability may be much lower than inversely proportional to capacity. As described herein, a k-out-of-n system refers to one in which information is represented redundantly across n underlying components, where the loss of any k or fewer of the n components can be tolerated using a known repair algorithm, as well as the information in the surviving n-k components.

BRIEF SUMMARY

An exemplary embodiment relates to methods, systems, and computer program products for predicting reliability of large-scale storage systems. A method includes identifying a set of components of a storage system and dependencies among constituent components in the set of components. At least one of the components' ability to function is dependent on at least one other of the components' ability to function. The set of components includes at least one data storage component and at least one computation component configured to operate within at least one datacenter. A method also includes identifying a size, strength, and storage placement scheme of the storage system; simulating operation of the storage system based on the identified size, strength, and placement scheme; and determining a mean time between loss event from the simulated operation. The mean time between loss event factors in the dependencies among the constituent components. The method further includes assessing reliability of the storage system as a function of the mean time between loss event.

BRIEF DESCRIPTION OF DRAWINGS

Referring to the drawings in which like elements are numbered alike in the several FIGURES:

FIG. 3 depicts formulae for use in modeling selected storage systems in accordance with an embodiment;

DETAILED DESCRIPTION OF EXEMPLARY EMBODIMENTS

Figure 1:
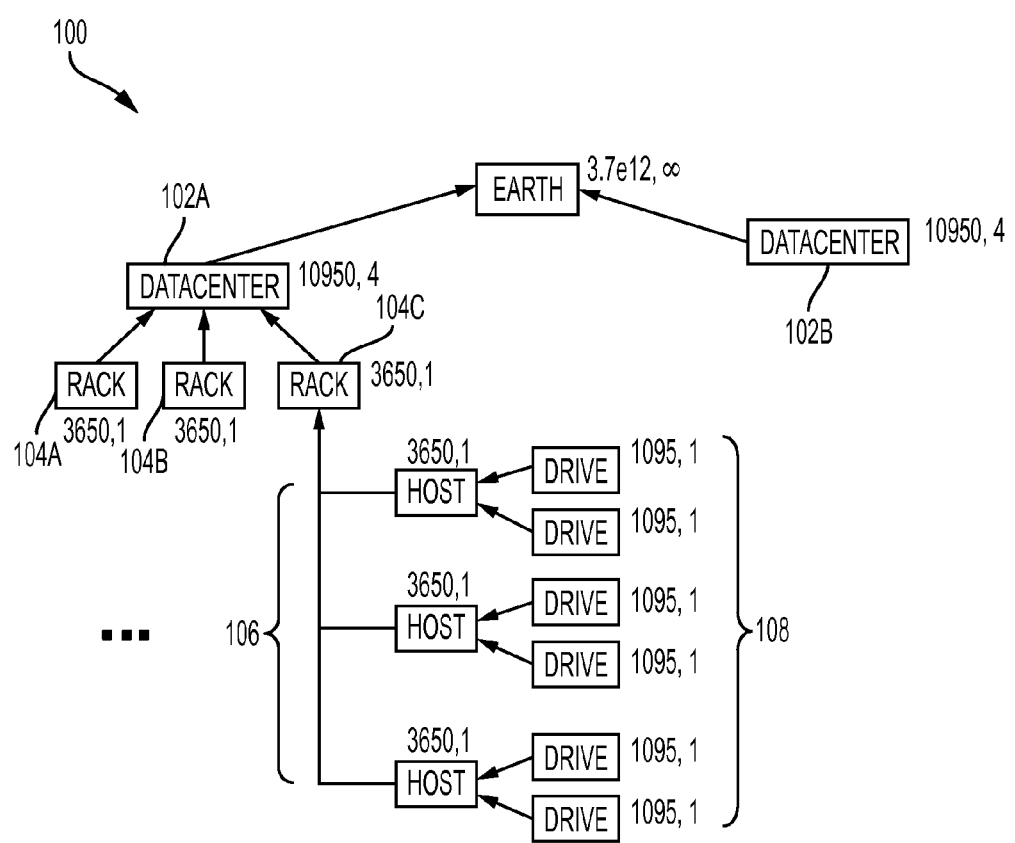
FIG. 1 depicts a simulated model of a storage system in accordance with an embodiment.

Embodiments are directed to predicting the reliability of large scale storage system designs and deployments. The embodiments include the ability to perform direct calculations based on a drives-only failure model and further include an event-based simulator for detailed prediction that handles arbitrary component failure models and dependencies. The framework can accommodate a spectrum of redundancy and share placement designs. The processes can use models of common storage systems, such as n-replicated (e.g., RAID-1 and Hadoop Filesystem (HDFS)) and erasure coded designs (e.g., RAID-6 and the Quantcast Filesystem (QFS)).

The exemplary embodiments described herein provide a framework for modeling a large class of storage systems at a high scale and deployment complexity in which a combinatoric characterization thereof supports both analytical and simulation models. In addition, the embodiments provide algorithmic formulas configured for mean time between loss events (MTBLE) and mean loss rate (MLR) when assuming only drives fail (ODF) mode reasoning. These processes can handle predictions to arbitrarily high scale when implemented using unbounded precision arithmetic and can be particularly useful for studying reliability scaling and for comparing the scaling of different redundancy schemes.

Further, the embodiments described herein provide a high performance simulator that allows measuring (modeled) reliability of storage systems deployed in large-scale (e.g., exabyte) data centers. An event-based design uses the same combinatorial core used by the ODF models. The framework enables illustrative scaling results and comparisons, including the spread catastrophe (i.e., the MTBLE of a spread-placed system decays rapidly (proportionally to $d^{-s}$ initially) with increasing capacity d, especially compared to that of the corresponding partitioned system).

Modeling Hardware Components

Storage systems are implemented out of physical components that are known to suffer failures over time due to a variety of causes ranging from normal use to extraordinary events such as power outages. Each physical component is assumed to experience failures according to some distribution, and also to undergo repairs at a rate that can be modeled. For ease of description, it is assumed in the embodiments described herein that hardware elements obey a simple exponentially distributed failure model characterized by its mean time to failure (MTTF). It is also assumed that repairs are characterized by a constant duration referred to as mean time to repair (MTTR). The exemplary framework can handle exponentially distributed repairs, if desired; however, for purposes of illustration, constant deterministic repairs are disclosed unless otherwise stated. While the embodiments described herein describe simple failure and repair behaviors, the simulation processes can easily incorporate arbitrarily complex, possibly stateful, failure and repair behaviors.

A drive is one example of a data storage component that can be modeled. A drive is a device that provides persistent storage of data bytes, and are generally known to be the most failure prone components in a storage system, as they contain (e.g., at least for magnetic disk technology) many moving parts that can wear out. For purposes of illustration, it is assumed herein that drives are identical in both storage capacity and MTTF. Unless otherwise, stated, it is assumed that drives store 4 TB ($2^{42}$ bytes) each and have a MTTF of three years (1095 days). Other data storage components can include, e.g., solid state storage devices, non-volatile storage devices, optical disk-based storage devices, RAM-based storage devices, and memristors. While the embodiments described herein refer to disk drives as the data storage components being modeled for ease of description, it is understood that other types of storage components can be modeled as well.

Storage systems are built from more than just data storage components. Computation components (e.g., computers that mediate access to data storage components) and racks can also be modeled. As described herein, racks refer to elements that contain computation components, such as host computers, and data storage components, and oftentimes a network switch that connects the computation components to each other and to an outside network. In addition, datacenters, which contain one or more racks, can also be modeled.

Each of these modeled elements has their own MTTFs and MTTRs. In addition, these components may also have dependencies. For example, a device is assumed to function at time t if and only if (a) it has either never failed or it has been repaired since its last failure, and (b) all components it depends upon are functioning at time t. Thus, there is a distinction between a failure and something that is non-functioning. While failure implies non-functioning, it is understood that an element may not function even if it has not individually failed. In the embodiments described herein, a dependency tree is indicated in which each drive depends upon a host, each host on a rack, and each rack on a datacenter, and each datacenter on the Earth. Thus, e.g., if a host fails, it may cause one or more drives not to function; if a datacenter fails, it causes all elements transitively depending on it not to function. Once an element resumes functioning, all elements depending upon it resume functioning as well, unless they have independently failed.

As shown in FIG. 1, e.g., a sample hardware model 100 that may be simulated by the embodiments described herein is provided in which each individual component in the model includes a corresponding MTTF, MTTR (in days), which is shown adjacent thereto. In FIG. 1, two datacenters 102A and 102B are shown. Datacenter 102A includes 3 racks 104A, 104B, and 104C, respectively, the functioning of each of which depends on the functioning of the datacenter 102A. Rack 104C, in turn, includes three hosts, collectively referred to as 106, each of whose functioning depends on the functioning of the rack 104C. Each host 106, in turn, includes 2 drives, collectively referred to as 108, and each of the drive's 108 functioning depends on the functioning of its corresponding host 106.

Files, Chunks, Strength, and Capacity

As systems store larger amounts of data and use larger numbers of fallible hardware components to do so, redundancy based reliability techniques have become essential. In these systems, extra space is used to store more than one byte per content byte. Typically, files are stored as collections of fixed-size segments. Without loss of generality, a file is described herein as one 64 MB segment, with the understanding that larger files can be constructed out of these. Each file is stored as a collection of n chunks, with no two chunks from the same file stored on the same drive. It is assumed that n=p+s, where p>0 is the number of primary chunks and s≥0 is the number of secondary (also referred to as redundant) chunks. In the embodiments described herein, it is assumed that data is permanently lost if and only if any subset of s+1 chunks or more are lost at the same time, otherwise data can be reconstructed. The indication of (p,s) for a storage system refers to its strength. The overhead of a storage system, defined as s/p, is one measure of the cost of the redundancy scheme. The byte capacity $C_b$ of a storage system containing d total drives and strength (p,s) is given by $C_b=dBp/(p+s)$, where B is the size of a single drive in bytes ($2^{42}$ unless otherwise stated). This is the number of content bytes that can be stored in the system, given that for each content byte, there must also be stored s/p overhead bytes. Given the assumption of fixed file size (i.e., 64 MB), the file capacity can be defined as $C_f=C_b/s_f$, where $s_f$ is the fixed file size (assuming $2^{26}$). Storage system reliability varies with size, so when comparing different systems, it is desirable to keep capacity the same, even though two systems having the same capacity may use very different numbers of drives.

Redundancy Types

Two types of redundancy are described in the embodiments: replication and error correction. Replication based systems, such as HDFS or RAID level 1, store one or more copies of content data in secondary chunks. By default, HDFS's triple replication has strength (1,2) and therefore, overhead 2, while RAID 1's mirroring has strength (1,1) and overhead of 1. Error correcting systems, such as the QFS or RAID level 6, store computed codes such as parity or erasure codes, in the secondary chunks. These enable detecting losses and reconstructing lost data. QFS's default strength is (6,3) with an overhead of 0.5, while RAID 6 can have (p,2) for different values of p, and with an overhead of 2/p.

In an embodiment, the reliability of storage systems is evaluated in terms of a given strength in order to allow stakeholders to match reliability requirements to costs as indicated, e.g., by overhead.

Chunk Placement Strategy

Assigning chunks to particular drives is referred to as placement. In the embodiments described herein, it is assumed that all placement strategies guarantee that no two chunks of the same file are assigned to the same drive. There are multiple factors that can dictate placement strategy, including reliability, data locality to computation, input/output performance, and network load balancing. Different placement strategies, such as partition and spread, are described herein with respect to their impact on storage system reliability.

For a storage system with strength (p,s), a partitioned placement strategy partitions the set of all d drives into d/(p+s) disjoint subsets (referred to as partitions) and obeys the constraint that for any file f, all chunks of f are placed on drives within a single partition. This definition implies that d is a multiple of (p+s), given the assumption that all chunks of a file are placed on distinct drives. By contrast, a storage system with a strength (p,s) has a spread placement strategy if each file's chunks are placed on a random set of drives. Such placements can overlap and do not confirm to any partition layout.

Figure 2A:
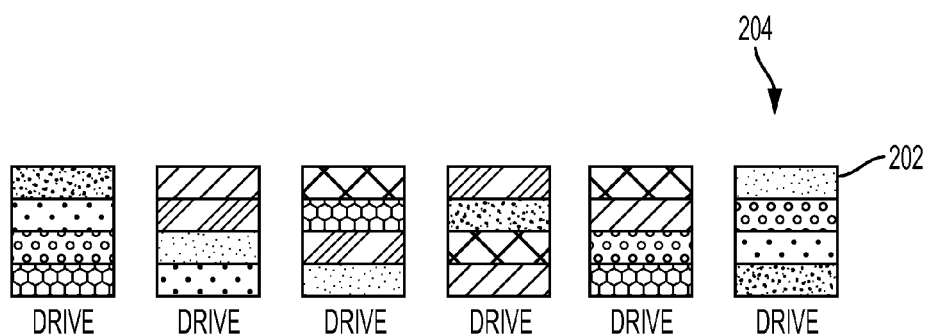
FIG. 2A depicts a set of drives implementing a spread placement scheme.
Figure 2B:
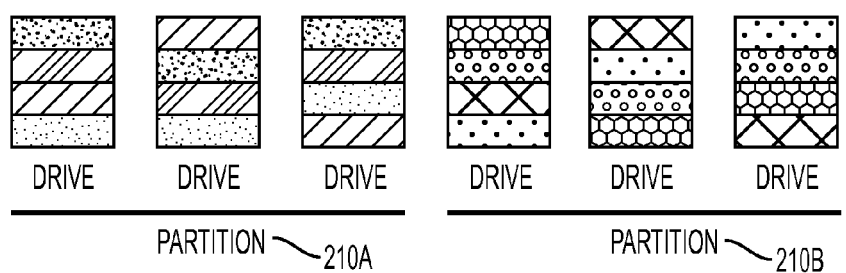
FIG. 2B depicts a set of drives implementing a partitioned placement scheme.

FIGS. 2A-2B illustrate the difference between two categories of placement strategies in a storage system: spread and partitioned. Individual files are represented by different shadings. Each shaded rectangle in a drive (e.g., drive 204) represents a file chunk 202, with chunks of the same shading corresponding to the same file. FIG. 2A shows that spread placement mixes chunks from many files on each drive 204, and each subset of the d drives can have chunks from one or more files. In this example, each of the 15 pairs of drives has two chunks from the same file; thus, for example, if any two drives fail, at least one file will be lost from a (2,1) scheme. FIG. 2B shows a partitioned strategy with two partitions 210A and 210B. For every file, either all of its chunks are in partition 110A or partition 110B. Only six of the 15 drive pairs have two chunks from the same file. Thus, a partitioned (2,1) scheme can only fail if two drives from a single partition fail, which is 2.5 times (15/6) less likely than the example in part (a).

Other Placement Strategies

Spread and partitioned placement schemes represent two ends of a spectrum. It is understood that there are many other schemes falling between these two in reliability. For example, copyset replication is based on defining z different partition structures over the set of drives such that there is at most one drive in common between partitions of different partition structures. While not as reliable as partitioned placement, it allows trading off reliability for increased scatter width, leading to more efficient access. Hadoop systems often use rack-aware placement, in which one file replica is placed on a different rack (to mitigate rack level failures) from all other replicas, which are concentrated in a single rack for efficient access. Spread-OnePerRack (Spread-1PR) is a scheme in which all shares of a given file are placed on different racks. In scatter-limited spread placement, each file whose primary copy is on drive i has its replicas placed within drives i+1 . . . i+z for some parameter z. This improves reliability over spread placement while still maintaining some access efficiency through enforced scatter width.

Abstract Models PSS and SSS

In the embodiments described herein, design details of extant storage systems are abstracted with a focus on strength and placement strategies. A partitioned storage system (PSS) with strength (PSS(p,s)), refers to a modeled system that uses partitioned placement and has a strength of (p,s). A spread storage system (SSS) with a strength (SSS (p,s)), refers to a modeled system using completely random spread placement and having a strength of (p,s). For SSS, each file's chunks are placed on randomly selected drives. For PSS, the chunks are placed within a single partition so that the partitions are all equally full. For both, distinct chunks are placed on distinct drives.

For both PSS and SSS, p>0, s≥0. Note that if p=1, then the secondary shares must each individually contain the information to reconstruct the file; therefore, from an abstract viewpoint, they model replicated storage schemes. The embodiments described herein evaluate and compare reliability of storage systems, in most cases using these two modeled storage system classes as examples. The results apply directly to real world instances having these properties.

Reliability Measures

In the embodiments described herein, independent control variables govern storage system performance and reliability, such as size, strength, and choice of placement scheme (e.g., spread versus partitioned). Size is indicated either by d, the total number of drives, or else by $C_f$, the total capacity (related to d through the formula above). Strength is indicated by (p,s). Choice of placement strategy is indicated by which model, PSS or SSS, is used.

It is assumed in the embodiments described herein that a file is considered to be lost if at least s+1 of its chunks are on nonfunctioning components at the same time. A loss event indicates a component failure that results in at least one file being lost that was not lost immediately before the event. The embodiments described herein provide reporting of reliability information in terms of two metrics, MTBLE and MLR.

It is understood that a large system will typically not stop after a single failure. For purposes of illustration, therefore, it is assumed in these embodiments that a large collection of components are continuously failing and being repaired. When a loss event occurs, an extraordinary action is taken to restore or replace the lost file, such as retrieving it from archival storage, recomputing it from other information, or simply replacing it with new content and compensating the stakeholder. Since these restoration events are very costly almost independently of the size of the loss, a key metric to storage providers is the frequency of such events, or its reciprocal, the mean time between loss events (MTBLE).

This is different from the mean time between failures (MTBF) or the mean time to first failure (MTTFF), because MTBLE includes repair time. MTBLE contributes directly to the steady-state cost of running a large storage system and is the metric focused on herein.

If desired, a MTBLE can be converted into a probability of non-loss over a given time interval. For example, $P_{365}=1-(1-1/\text{MTBLE})^{365}$, wherein MTBLE is measured in days and $P_{365}$ is the probability of non-loss in one year. $P_{365}$ may be quoted as a number of "nines" of reliability, such as five nines indicating $P_{365} \geq 0.99999$.

Mean Loss Rate (MLR)

Another metric is the average rate at which a storage system loses content bytes, expressed as a fraction of capacity per unit time. This is the mean loss rate (MLR). This is applicable in situations where the regeneration cost of lost data varies with its amount, in which data has a low per-byte value, such as when losing a few frames out of a video has no significant impact on user experience.

The Core Model

The following notation is described for use in implementing the exemplary embodiments.

Allowed sp1-sets

Let S(p,s,d) be a storage system with strength (p,s) and d total drives. When clear from context, the parenthesized parameters may be omitted for brevity. S's capacity is dp/(p+s) drives. An sp1-set (of drives) is defined as any subset of s+1 drives in the storage system, where 's' is the number of secondary chunks in the placement strategy's strength. An sp1-set is 'allowed' by a placement strategy if and only if the strategy could possibly place a file/object's chunks such that s+1 of them are put onto the drives of the sp1-set. For example, in FIG. 2A, s=2, so the sp1-sets are sets of three of the six drives. In spread placement strategy, all of the 20 sp1-sets are allowed. By contrast, in FIG. 2B's partitioned strategy, only two of the sp1-sets are allowed (each of the partitions is an sp1-set in this case). Storage system S will lay out the p+s shares of each file according some placement strategy. As indicated above, an sp1-set is in the allowed set of S, $A_S$, only if it is possible for S to place s+1 of some single file's shares on its drives. For example, in SSS all sp1-sets are allowed; for PSS, however, shares of a single file will never be placed on an sp1-set that is split between two partitions, so such sp1-sets are not in $A_{PSS}$ Modeling Assumption (MA)

For the analysis herein, it is assumed that storage systems place file shares uniformly and randomly within their allowed sets. This is true of spread, limited-spread, and rack-aware schemes, and an excellent approximation for partitioned, copyset, and related schemes.

In operation, once S(p,s,d) is filled with (placed) files, an sp1-set a is defined to be occupied if there exists at least one file having s+1 of its shares placed on the drives of a. In general, a placement may not occupy all allowed sp1-sets. As a consequence of the modeling assumption above, each sp1-set has equal probability of being occupied, so this probability of occupation (POS) as the probability that an allowed sp1-set is occupied by a placement of S. It follows assumption MA that $$PO_S = 1 - (1 - 1/A_S)^{C_f\binom{p+s}{s+1}}$$

As described herein, in both simulation and the analytical tools, PO is used to determine whether the failure of a drive represents a loss event, because an sp1-set of failed drives represents a loss if it is occupied. FIG. 3 gives $A_S$ formulae for selected storage systems as well as A and PO values for a particular set of parameter values.

Only Drives Fail Reliability

Analytical formulae will now be described for MTBLE and MLR for storage systems when the only components with finite MTTF are the drives themselves. All others are assumed to never fail. Moreover, the drives fail independently and at the same rate. This is referred to herein as only-drives-fail (ODF) reliability.

The analysis described herein is useful in understanding scaling behavior of reliability with capacity, but also gives insight when making design and cost tradeoff decisions. In addition, even though any storage system must be implemented within fallible datacenters, it is useful to understand the contribution to overall reliability of the inherent storage system design itself (as opposed to failures of non-drive elements).

Computing MTBLE

Under the ODF assumption, a loss event may only occur when a drive fails. Specifically, it must be that (a) a drive fails while at least s other drives have previously failed and have not yet completed repair, and (b) there exists an allowed, occupied sp1-set consisting of the failing drive and s of the other failed drives. The embodiments described herein sum over all such cases weighted by their probabilities.

The general probability of occupation (GPO) is defined herein as the probability that a randomly selected sp1-set is occupied. Recall that PO is defined with respect to allowed sp1-sets. Using Bayes' Theorem, GPO can be computed as the product of PO and the probability that it is allowed:

$$GPO_S = \frac{PO_S \cdot A_S}{\binom{d}{s+1}}$$

Suppose a drive fails while exactly L other drives are already nonfunctioning (but not yet repaired). This creates $$\binom{L}{s}$$

sp1-sets of failing drives that could possibly imply a loss event (any s of the nonfunctioning drives plus the current failing drive). The general loss event probability (GLEP) function maps L to the probability of a loss event occurring due to the failure of a randomly selected drive while L other drives are already failed:

$$GLEP_S(L) = 1 - (1 - GPO_S)^{\binom{L}{s}}$$

Figure 4:
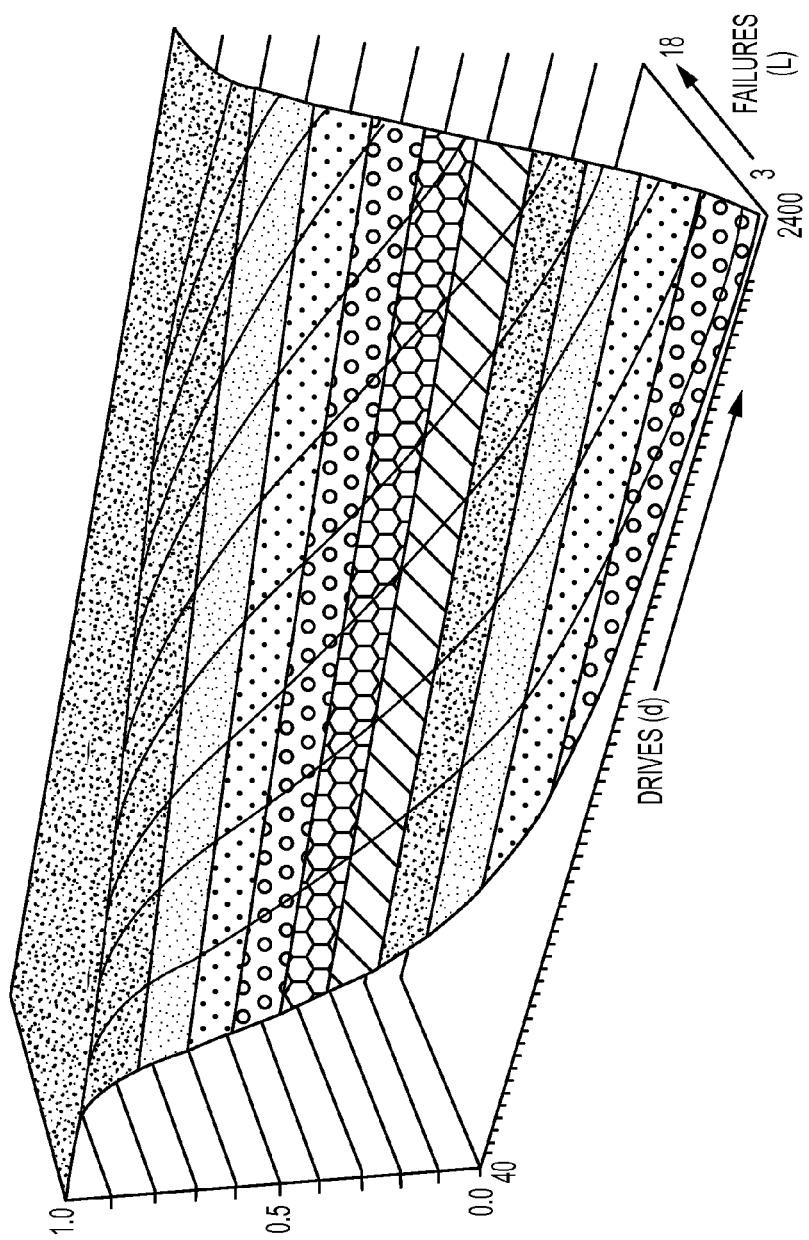
FIG. 4 is a graph illustrating general loss event probability of a storage scheme in accordance with an embodiment.

FIG. 4 graphs the value of GLEP for SSS(6,3) versus the number of drives (d) and number of failures (L). Note that for any given d, it rises quickly toward 1; for example, at d=1080 it rises to around 0.5 at L≈11. So in general it does not take many failures to make loss event likely for SSS. By contrast, the similar surface for PSS(6,3), not shown, starts at 0.00000027 at 1080 drives and 3 failures and does not rise to 0.5 until L≈250. This explains why PSS's MTBLE is so much higher than SSS's MTBLE. Ultimately, even though $PO_{PSS}$ is 1.0, $GPO_{PSS}$ is tiny, due to $A_{PSS}$ being very small (as compared to $A_{SSS}$, for example).

The MTBLE of S may be computed as the reciprocal of the loss event frequency, which can be computed as the following sum, where the sum is over all possible numbers of concurrent drive failures, weighting each case by its probability:

Theorem MTBLE. Let f be the drive failure rate and r the repair time. Then, $$(MTBLE_S)^{-1} = \sum_{L=s}^{d-p} df \binom{d-1}{L} (rf)^L (1-rf)^{d-L-1} GLEP_S(L)$$

Proof Sketch: the overall frequency of loss events is the sum of the frequencies of loss events occurring when L drives are already failed for each L from s up to d-p. For each L, the frequency is df times the probability of exactly L other drives being failed times the probability that such a failure results in a loss event (GLEP(L)).

Computing MLR

The average loss rate (expressed as a fraction of the total size) of the entire storage system is the same as the loss rate for each file, by symmetry of the underlying ODF hardware model. Any subset of p+s drives experiences a failure of one of its sp1-sets at the same average rate as any other subset of p+s drives. An individual file experiences 100% loss at each event involving one of its sp1-sets. The MTBLE of a single file is the same as that of a storage system of the same strength having d=p+s, because all files in the storage system are placed on the same set of drives. This proves Theorem MLR.

$MLR_{S(p,s,d)} = (MTBLE_{S(p,s,p+s)})^{-1}$

Where d≥p+s and MLR are expressed in units of total capacity per time unit. The ODF-MLR tool embodies this formula.

A corollary of this is obtained by simplifying the above expression for MTBLE using d=p+s:

Corollary 1. MLR depends only on p,s,f,r and not on storage system type ($A_S$) or capacity (d).

Proof: For any S, $$A_{S(p,s,p+s)} = \binom{p+s}{s+1}.$$

Even though storage system type and capacity strongly affect MTBLE, the average rate of losing content (MLR) is unaffected by them. Note that this is true only for ODF models where all drives fail independently at the same rate.

Sectioned Storage Systems

Not all storage systems implement one scheme across all of its drives. Large data centers often incorporate multiple heterogeneous storage arrays, appliances, and disks. Each may have its own redundancy scheme.

A sectioned storage system refers to one in which the d drives are divided into disjoint subsets, referred to as sections, each having its own independent choice of partitioned, spread, or some other redundancy scheme. Sections need not all use the same strengths. In fact, a section could itself be a sectioned storage system or some other type, allowing one to build recursive storage structures out of heterogeneous parts.

The reliability of a sectioned system K comprising sections $K_i$ for i=0 ... u obeys the Sectioning Principle:

$$(MTBLE_K)^{-1} = \sum_{i=0}^{u} (MTBLE_{K_i})^{-1}$$

Assuming drives fail independently, as in ODF reasoning. This is because loss events occur concurrently in all the sections so the loss event rates add.

Corollary 2.

$$(MTBLE_{PSS(p,s,d)})^{-1} = \frac{d}{p+s}(MTBLE_{PSS(p,s,p+s)})^{-1}$$

Proof: This follows from the above formula for sectioned systems as well as the previous formula for MTBLE by setting d=p+s to compute MTBLE of a single partition. Note that GLEP for a single partition is 1.0, because every sp1-set of a single partition must be occupied.

The formula for deducing MLR of K is similar, but must be weighted in proportion to section capacities:

$$MLR_K = (1/C) \sum_{i=0}^{u} C_i MLR_{K_i}$$

Where $C = \Sigma_{i=0}^{u} C_i$ is the capacity of K, and $C_i$ are the capacities of the sections.

The sectioning principle is useful in various ways. For example, instead of using spread placement across all drives, one might create sections and use spread placement within each. This will increase reliability much faster than linearly in the number of sections, because the reliability growth law is so steep. For example, a sectioned system consisting of 100 sections, each instantiating SSS(6,3) at 108 drives, would have MTBLE=723 days, whereas a single SSS(6,3) at 10800 drives has MTBLE=2 days.

Sectioning is also useful when a datacenter contains heterogeneous storage appliances that are to be combined into a larger system. Each appliance's reliability can be analyzed independently and then combined using the sectioning principle above.

ODF Tool Design

Each formula can be directly translated into code using double precision floating point. However, due to the wide dynamic range of intermediate values, the exemplary processes herein use a custom floating point representation that accommodates exponents in the range $(-2^{31}, 2^{31}-1)$, which is much larger than the range of IEEE double precision exponents. It also normalizes the mantissas to maximize retained significant digits. The multiplications and divisions within the formulae are reordered and renormalized to keep intermediate results' exponents as small as possible. Using these techniques, ODF-MTBLE can be used to compute MTBLE for large parameter values, such as d>100,000,000, p>20, and s>20.

The ODF tools are extensible to accommodate new storage systems, where the extension is to redefine the allowed-sets method. That is, each storage system is characterized by the size of its allowed sets subspace and a method computing it from p,s,d and any other parameters specific to the storage system, such as the number of racks, scatter width, etc.

ODF Reliability Scaling Results

The ODF computational tools derived above can be used to compare the reliability of different storage systems at any chosen strength and number of drives. The tools verify that loss events under the spread placement strategies (represented by SSS) are much more frequent than under partitioned schemes (represented by PSS).

Figure 5:
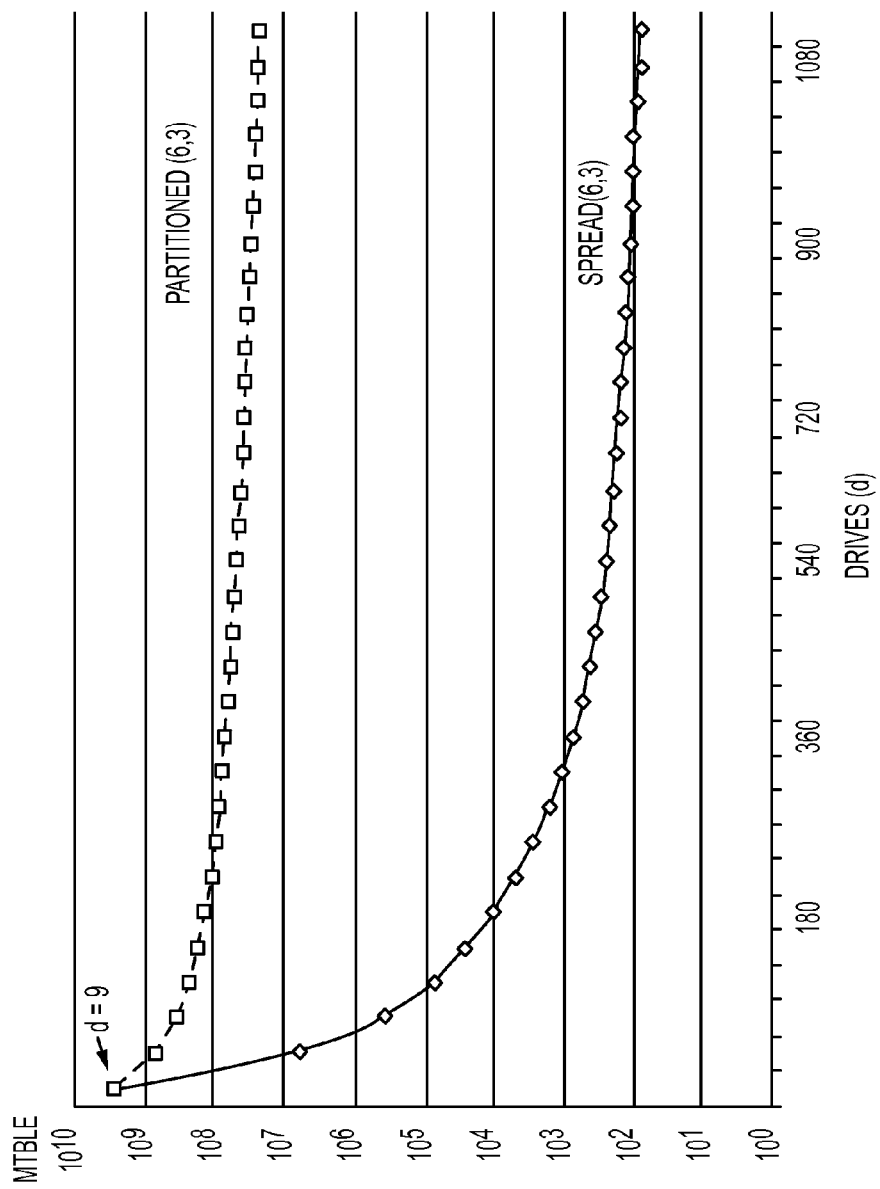
FIG. 5 is a graph illustrating the scenario in which a spread placement strategy's reliability drops faster as capacity increases than does that of a partitioned strategy (the rapid drop referred to as the spread catastrophe), in accordance with an embodiment.

By way of illustration, FIG. 5 graphs MTBLE (log scale) versus number of drives for strength (6,3), comparing spread (SSS) to partitioned (PSS). As expected, at 9 drives (=p+s), the two have the same MTBLE of 2.9 billion days. However, while PSS(6,3)'s MTBLE drops inverse linearly, SSS(6,3)'s MTBLE drops much faster. At 1080 drives, SSS(6,3)'s MTBLE is only 76 days, while that of PSS(6,3) is still 24 million days. Note that both schemes have MLR=3.48×10$^{-10}$ (files per day per file of capacity) at all values of d. For example, assuming d=1080 and 4 TB drives, this would imply a loss of 4,404,098 bytes per day. Thus, whereas one expects to wait over 65,753 years between losses using PSS, one can expect to lose around 335,592,268 bytes once every 76 days when using SSS.

This trend continues into higher d ranges. At 10,800,00 drives (≈40 EB), for example, MTBLE of PSS(6,3) is 2397 days (over 6.5 years), while the MTBLE of SSS(6,3) is 0.0061 days (about 8.8 minutes).

This spread catastrophe is present at all strengths where s>1 and is explained ultimately by the sizes of the allowed sp1-sets subspaces, which are large for spread and small for partitioned. These, in turn, dictate the shapes of the corresponding GLEP surfaces. For spread, the GLEP rises quickly to 1.0 as concurrent failures increase, while for partitioned, the GLEP is very low until there are many concurrent failures, which is correspondingly rare. The drop of PSS's MTBLE is inversely proportional to d for all d ranges. SSS's MTBLE, on the other hand, drops early on in proportion to a factor of:

$$1 \Big/ \binom{d-1}{L}, \text{ for } L \geq s.$$

Over this early period of relatively low d, this decay is roughly proportional to $d^{-8}$, so the stronger the scheme (i.e. greater s), the more precipitous the drop-off of SSS's MTBLE. At larger d ranges, the drop slows, approaching proportionality to 1/d.

As d grows large, the ratio between the MTBLE of PSS and that of SSS appears to converge to a constant. That is, after an initial period of rapid decay, the reliability drop with increasing capacity of SSS starts matching that of PSS, albeit at a much lower absolute level. This ratio is different for different strengths. For example, at strength (1,2), the ratio converges to approximately 64,000 beyond about 10,800 drives. This holds at least out to 108,000,000 drives (432 EB). At strength (6,3), the ratio converges to approximately 393,000 around 5,040 drives. Again, it holds at least out to 108,000,000 drives.

Figure 6:
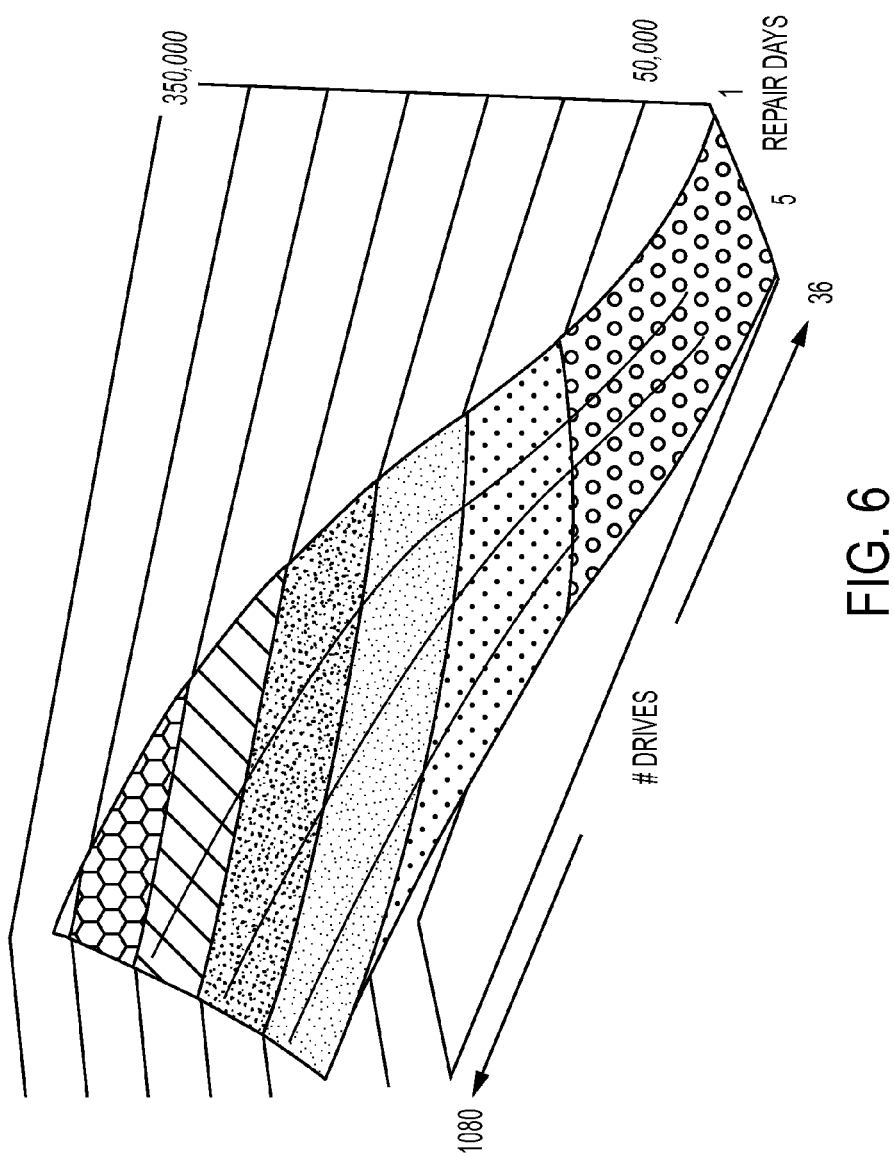
FIG. 6 is a graph depicting a ratio of mean time between loss events for two types of storage placement schemes in accordance with an embodiment.

FIG. 6 illustrates the effect of increasing time-to-repair on MTBLE and the spread catastrophe. FIG. 6 graphs the ratio of MTBLE of PSS to SSS versus both number of drives and days to repair. Both PSS and SSS have their MTBLE drop with increasing time to repair. Apparently, it drops faster for PSS, as the ratio of PSS to SSS drops with increasing time to repair.

Comparing Storage Systems to Each Other

Figure 7:
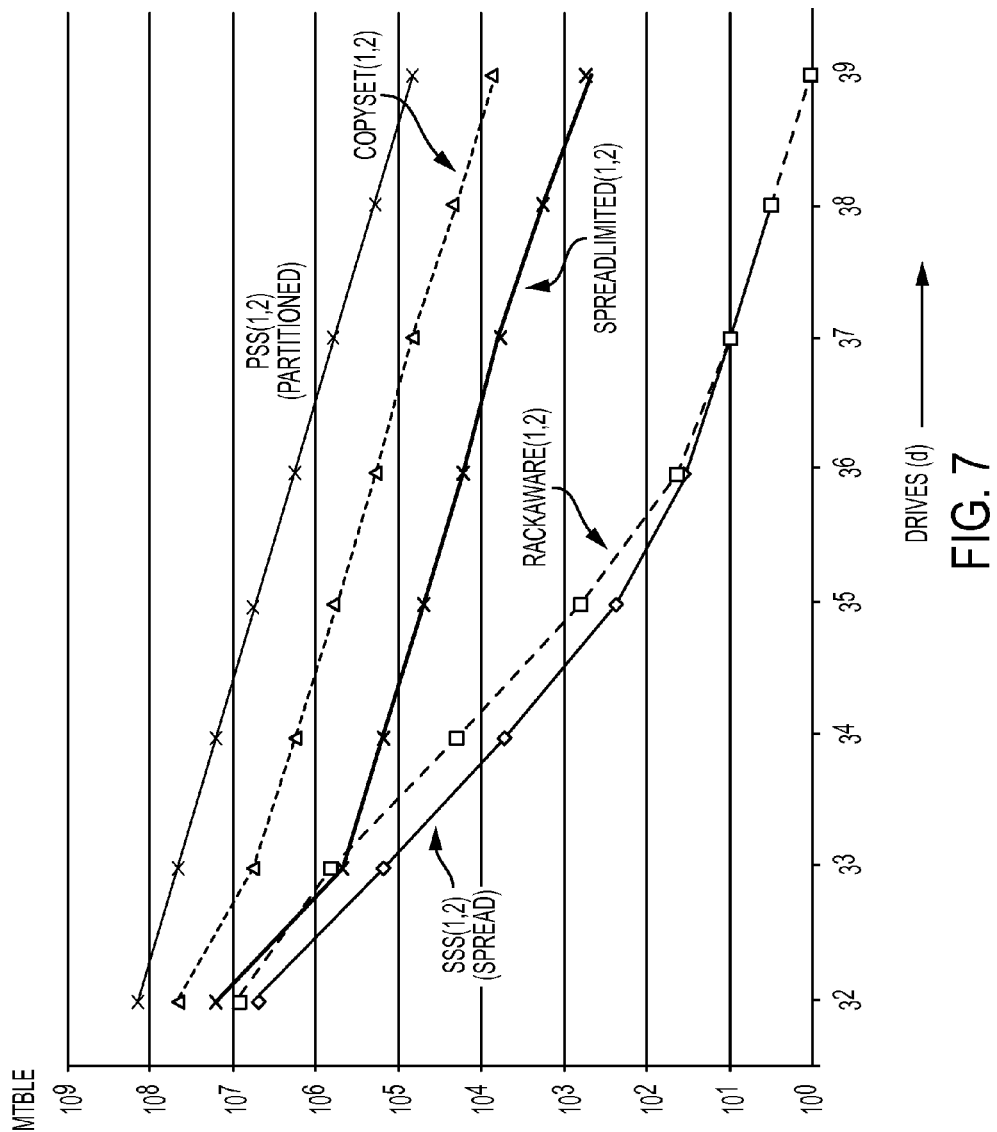
FIG. 7 is a graph depicting mean time between loss events for five types of storage systems in accordance with an embodiment.

The ODF tool can be used to compare different storage systems' scaling laws to each other, as shown in FIG. 7 for five storage systems at strength (1,2). PSS, which is inverse-linear in d, appears as a straight line in this log-log plot. Copyset and SpreadLimited are evidently also inverse linear for fixed z values. (These graphs use z=9, expect at d=9, where z=3 was used). SSS drops $d^{-2}$ when s=2. Rack-aware is asymptotic to SSS, but slightly higher for low d.

The ODF tool can also be used to compare storage systems of different strengths to each other as well, though the number of drives should be adjusted to match capacities. For example, suppose one questions which has greater MTBLE between SSS(6,3) or SSS(12,3) at capacity of 288 TB (72 drives). To have this capacity, the (6,3) strength would need to employ 108 drives, while the (12,3) capacity would need only 90. In this case, the MTBLE of SSS(12,3), 149,718 days, is higher than that of SSS(6,3), 72,266 days. By contrast, the MTBLE of PSS(12,3), 44 million days is significantly lower than that of PSS(6,3), 240 millions days, at that capacity.

Detailed Reliability Modeling

When evaluating storage system reliability as deployed, the failures of other elements making up the deployment must be considered. While this could, for each such detailed deployment, be handled analytically as in the ODF case, the details get complex. Complexity arises from (a) dependencies among failures, (b) heterogeneous component types, such as solid state storage versus magnetic disk storage having different failure properties, and (c) behavioral impacts on reliability such as drive reliability varying with drive traffic in addition to time. For these reasons, these more detailed issues can be approached using modeling and simulation. Specifically, the processes described herein provide an event-based Monte Carlo simulation of modeled software components interacting with modeled hardware components.

Hardware and software configurations are input via a structure file that describes their types, parameters, and relationships, as described above. This file can be built manually for simpler descriptions, but the toolset also provides a structure generator SimGen( . . . ) that can be used to generate automatically a hardware file from a few input parameters. SimGen was used to generate the runs from which the data herein was gathered. It is built around a particular multi-datacenter design schema with parameters governing numbers of drives, hosts, racks, datacenters, and structural information such as hosts per rack, etc.

The event based-simulator includes an event queue kept sorted by event time. The inner loop simply removes the earliest event from the queue and provides it to all registered event handlers whose event-masks match the event type. They can manage state and schedule one or more events at some time in the non-past.

Hardware Element Models

Each hardware element starts in the non-failed state and schedules at a random time in the future its first failure event. The model used to generate this time is currently an exponentially distributed random delay based on the MTTF declared in the structure file for that component. When a component receives a failure event, it changes state to failed and nonfunctioning and notifies all components depending upon it to change to nonfunctioning. It then schedules its repair event according to the MTTR in the structure file. When a component repairs, it notifies all of its dependents to return to functioning unless they have some other reason not to, such as being failed themselves or some other component on which they depend being failed.

Note that "failed" and "nonfunctioning" are distinct concepts. A drive can transition to nonfunctioning either due to its own failure or the failure of a component, such as a host, on which depends.

If the structure file gives infinite MTTFs for all non-drive components, we have only-drives-fail semantics. Thus, it is expected that the simulation results should be consistent with the ODF tools described above. This gives a way to validate both ODF tools and simulator by cross-checking their ODF results. Only once finite MTTFs are introduced to non-drive components will there be effects of other real world failure scenarios.

The embodiments are described herein as using simple hardware failure and repair models described above; however, it will be understood that different failure and repair behaviors can be modeled by the simulator in order to more faithfully model drive and component behaviors experienced in the real world.

Storage system software models, such as SSS and PSSS, run on this simulator. Each time a drive transitions to nonfunctioning, all storage system models of which it is a part are notified. Their models then decide whether to change state based on their semantics.

A General Modeling Method

To simulate a storage system, it should be determined whether when any given drive transitions to nonfunctioning it represents a loss event. It is also needed to be able to track the average rate of file loss. However, since it is desirable to see the effects of hardware and other dependencies, GLEP is not used to compute this, since GLEP's definition assumes independent random drive failures. Thus, a generic simulator model design for storage systems is described that is customized to each storage system through defining two combinatorics methods: failureSets and goodFraction.

A failure set is an sp1-set all of whose drives are in the nonfunctioning state. For a storage system S, the Specific Loss Event Probability ($SLEP_S$) is a function mapping a non-negative integer to a probability value. When the integer counts the number of allowed failure sets that all contain a given drive $\delta$ that has most recently transitioned to nonfunctioning, the output will be the probability that the transition is a loss event. From the definition of PO, $$SLEP_S(L) = 1 - (1 - PO_S)^L$$

where $0^0 = 1$.

A storage system simulation model is an object supporting two methods, OnElementFailure and OnElementRepair. The former is invoked each time a drive, $\delta$ on which the instance depends goes to nonfunctioning, and the latter when the transition is back to functioning. To implement a model, the general approach is to use state to keep track of enough information to be able to calculate the method failureSets ($\delta$) which returns the number of allowed failure sets involving $\delta$. OnElementFailure then calls SLEP on that number to the probability P. If positive (simulated) time has passed since the most recent loss event, then the model generates a random number $x \in [0,1]$ and, if $x < P'$, counts a loss event and updates the time of last loss event. Note that by keeping track of last time of loss event, overcounting loss events due to a hardware element's failure is avoided.

Computing failureSets depends intimately on the specific storage system used. The following examples of failureSets computations using different types of storage systems will now be described.

In a spread placement model, SSS only needs to maintain the count FCnt of current failed drives. In this instance, failureSets can be computed (independent of $\delta$ as $$\binom{FCnt}{\delta}.$$

SSS's OnElementFailure method increments FCnt, and OnElementRepoair decrements it.

In a partitioned placement model, PSS keeps track of a count $FCnt_i$ for each distinct partition i of the number of failures within the ith partition. OnElementFailure looks up the partition j and $\delta$ and, if $FCnt_j$ is exactly s on entry, then failureSets returns 1; otherwise, failureSets returns 0. OnElementFailure increments $FCnt_j$, and OnElementRepair must decrement the appropriate partition's $FCnt_j$.

In a copyset placement model, the operation is similar to partitioned, except it maintains a separate set of partition counts for each of the z distinct partition schemes. It then computers failureSets as the sum of the failureSets values of the different partition schemes, and returns this sum as the result.

In LimitedSpread placement models, failureSets is computed as follows. For each $i \in [0 \ldots z-1]$, it counts the number Li of nonfunctioning drives among drives $[\delta-i, \delta-i+z-1]$ and sums $$\binom{L_i - 1}{s}$$

for all i. FailureSets returns that sum. Neither OnElementFailure nor OnElementRepair maintains separate state from that of the underlying hardware simulator, which keeps track of functioning status of the drivers.

To track the MLR statistic, the model assumes a goodFraction subroutine, whose implementation is specific to the storage system type. GoodFraction returns the fraction of total capacity that is within nonfailed files at the time it is called; this value will generally be less than 1 if several drives are failed at once. The pseudo code below shows OnElementFailure and OnElementRepair excerpts that jointly implement a simply algorithm to track MLR using goodFraction. Essentially, drops in goodFraction are summed and MLR is computed as the average of the drops over simulation time.

Initially
    gf:=1
    SumOfFailures:=0
    LastFailureTime:=−1
OnElementFailure
    x:=goodFraction( )
    SumOfFailures:=SumOfFailures+(gf−x)
    LastFailureTime:=now( )
    gf:=x
OnElementRepair
    gf:=goodFraction( )

Finally

MLR:=SumOfFailures/LastFailureTime

Spread Placement Model:

$$\frac{\sum_{i=0}^{s}\binom{L}{i}\binom{d-L}{p+s-i}}{\binom{d}{p+s}}$$

where L is the current total number of nonfunctioning drives. The estimate is computed as the number of nonfailed allowed file placements divided by the total number of allowed file placements.

Partitioned Placement Model:

$$\frac{|\{i \mid L_i \leq s\}|}{\binom{d}{p+s}}$$

where $L_i$ is the number of nonfunctioning drives in the ith partition.

Copyset Placement Model:

$$\frac{|\{i, j \mid L_{ij} \leq s\}|}{z\binom{d}{p+s}}$$

where $L_{ij}$ is the number of nonfunctioning drives in the jth partition of the ith partition scheme, and z is the number of partition schemes. Hybrid Storage System Models. Sectioned systems can be modeled by first extending models of component subsystems, such as PSS or SSS models, to schedule a zero-delay event of a new type each time it detects its own loss event; a model of the higher level sectioned system receives this event and counts its own loss event and file statistics accordingly. In this way, assembly of arbitrary sectioned systems is straight forward, given models of all the primitive subcomponents.

Simulator Performance

The time complexity of the simulator is represented as O(TV lg V), where T is the number of simulated days and V is the number of components. This result assumes that each component generates on average a constant number of events per day. Constant rate failure models, such as those described here, satisfy this, as do many common stateful failure models. The result also assumes that the goodFraction and failureSets methods execute in constant time. While the combinatorial definitions given may not appear so, PSS, SSS, and the other storage systems can be implemented to be O(1).

Statistical Confidence in Results

To use the results of a Monte Carlo simulation, one must address the problem of how close the reported results are to the underlying true values. Confidence increases as the number of samples used in the reported average increases. In the simulator, Guerriero's result is adopted: one can expect with 95% confidence that the true values lies within [m $\sqrt{n-1}/(\sqrt{n-1}+1.96)\ldots m\sqrt{n-1}/(\sqrt{n-1}-1.96)$], where m is the sample mean and n is the number of samples.

Impacts of Distribution and Placement Strategies

The use of the simulator will now be illustrated by examining the effects of non-drive component failures. Such failures have the effect of introducing dependence and correlation among failures that lead to effects not present in the ODF results. This section has two purposes. One is to illustrate information that can be found using the simulator that is not available just using ODF reasoning tools and techniques. However, it is also to further demonstrate the reliability effects of the spread strategy (and related) compared to the partitioned strategy. This is not to deprecate the spread strategy, as it may have benefits such as in reducing network traffic and speeding up I/O requests.

Modeling Datacenter Failures

It is first considered the distribution across datacenters and how it affects reliability. Datacenters provide a coarse level of distribution, with many drives in each one. Further herein, finer-grained distribution effects are described. A modeling took, such as GenSim may be used to generate PSS and SSS instances at numbers of drives from 72 to 1080 in steps of 72 crossed with models having from 1 up to 6 datacenters. When more than one datacenter is present, GenSim distributes the drives as evenly as possible across them, with no two drives of a single PSS partition lying in the same datacenter when possible.

Figure 8:
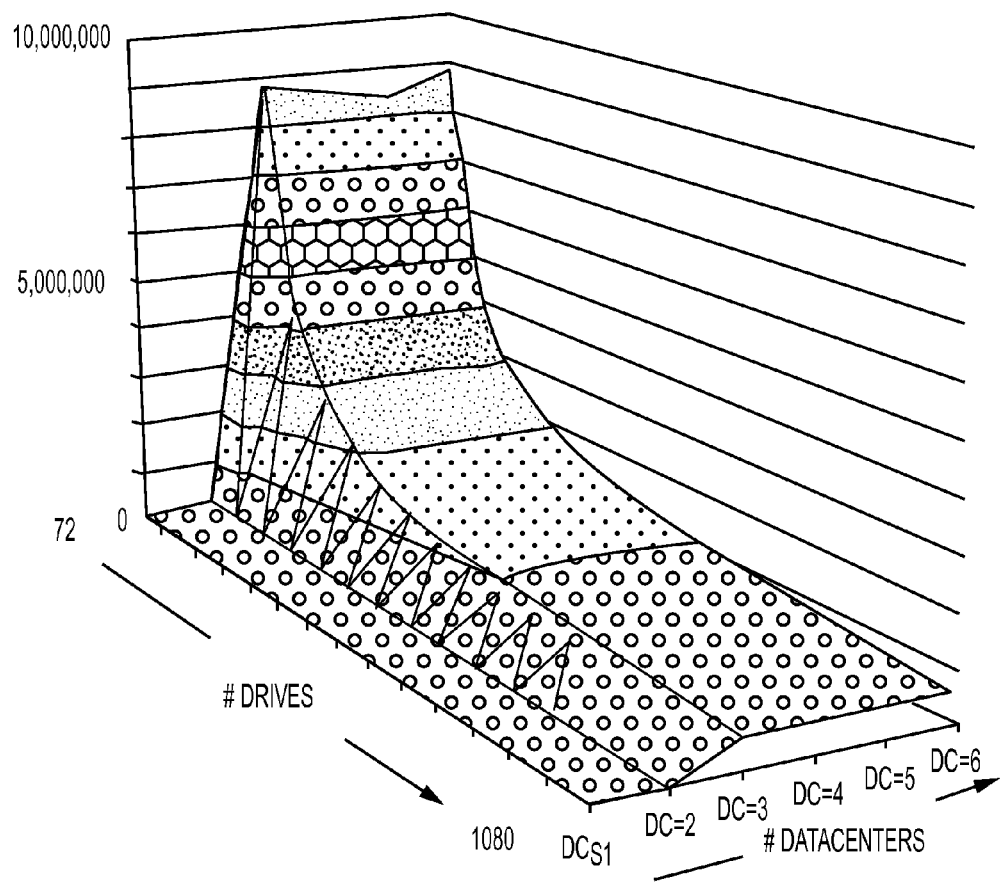
FIG. 8 is a graph depicting mean time between loss events for a partitioned strategy for varying values in the number of drives (capacity) and for varying numbers of data centers used in distributing the drives in accordance with an embodiment.

FIG. 8 graphs MTBLE of PSS(1,2) versus both number of drives and number of datacenters. When increasing the number of drives for a fixed number of datacenters, the inverse-linear decay expected of PSS can be seen. However, as the number of datacenters increases, a modest growth is seen at first, followed by an enormous growth. In one datacenter, since PSS(1,2) abstractly has very high MTBLE, it is the MTTF of the datacenter itself that dominates. At two datacenters, the MTBLE has increased beyond this, because now partitions will have at most two drives per single datacenter, so datacenter failure will not immediately result in PSS data loss. It is, however, more vulnerable during those repair periods, so its MTBLE is not as high as the ODF MTBLE. At three datacenters, each partition is fully distributed, so the ODF MTBLE is achieved, reduced slightly because the datacenter failure rate increases the effective drive failure rate slightly. Increasing beyond three datacenters does not further improve MTBLE.

Figure 9:
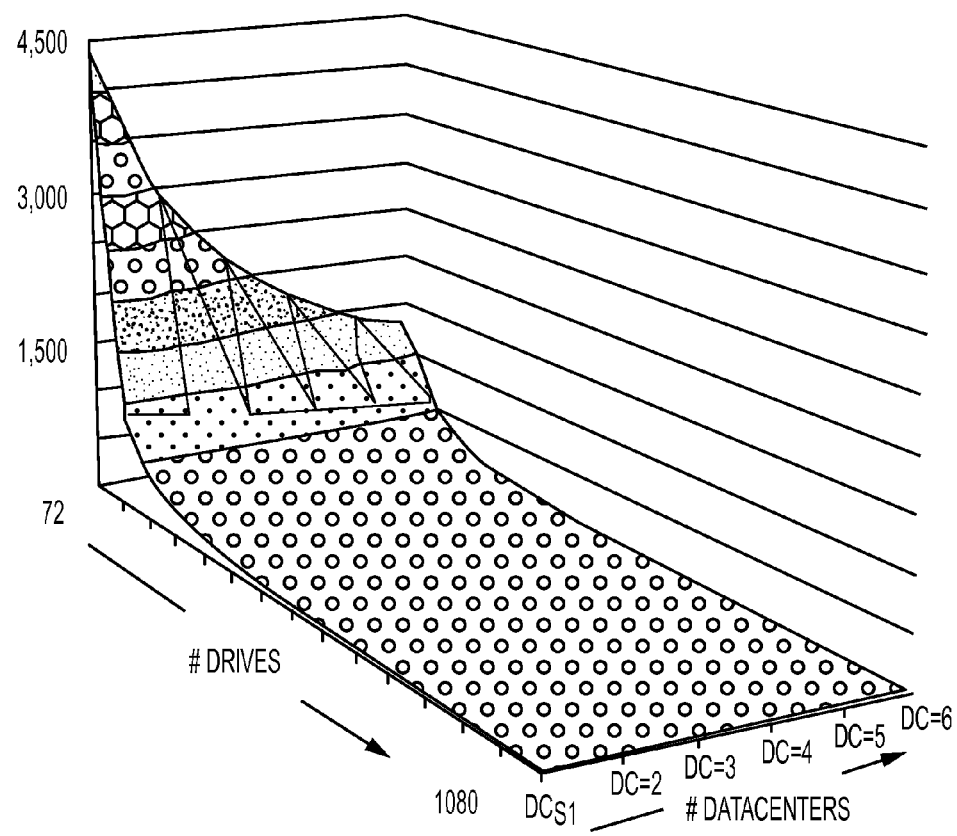
FIG. 9 is a graph depicting mean time between loss events for a spread strategy for varying values in the number of drives (capacity) and for varying numbers of data centers used in distributing the drives in accordance with an embodiment.

In FIG. 9, MTBLE of SSS(1,2) is graphed. Its highest point is far below the lowest point of the PSS graph in FIG. 8. In addition, SSS is only disadvantaged by distribution. That is, the more datacenters' chunks/drives are spread to, the worse its MTBLE becomes This is because, as SSS spreads files across nearly all possible combinations of datacenters, it is vulnerable to any combination of failures, whereas PSSS is only vulnerable to combinations that concentrate within partitions. Thus, spreading SSS more widely just gives it more ways to experience loss.

Modeling Hosts and Racks

Where datacenters provide coarse-grain distribution, the simulator allows one to model fine-grain distribution as well. In an embodiment, MTTF of racks and hosts are set to 10 years (3650 days) and MTTR to 1 day. GenSim( ) was set to lay out drives 3-to-a-host; that is, each drive must be accessed via a host and each host manages three drives. Each rack contains up to 30 hosts, depending on how large an instance is run. Thus, hosts provide small groupings with the host a common point of failure for the group.

Running the same set of simulations in the hosts and racks model as is run in the datacenters model enables one to compare results between the models. If the ratio of MTBLE is computed in the datacenters-only run to that of the full model run, one can see that SSS(1,2)'s MTBLE drops by a factor of 3, while PSS(1,2)'s MTBLE is only negligibly affected (ratio nearer to 1 than the confidence interval width). This is due to the fact that SSS's random placement can't avoid placing some files' shares on drives depending on the same host, while the PSS layout will not do so. Thus, single host failures become a significant source of loss events.

Figure 10:
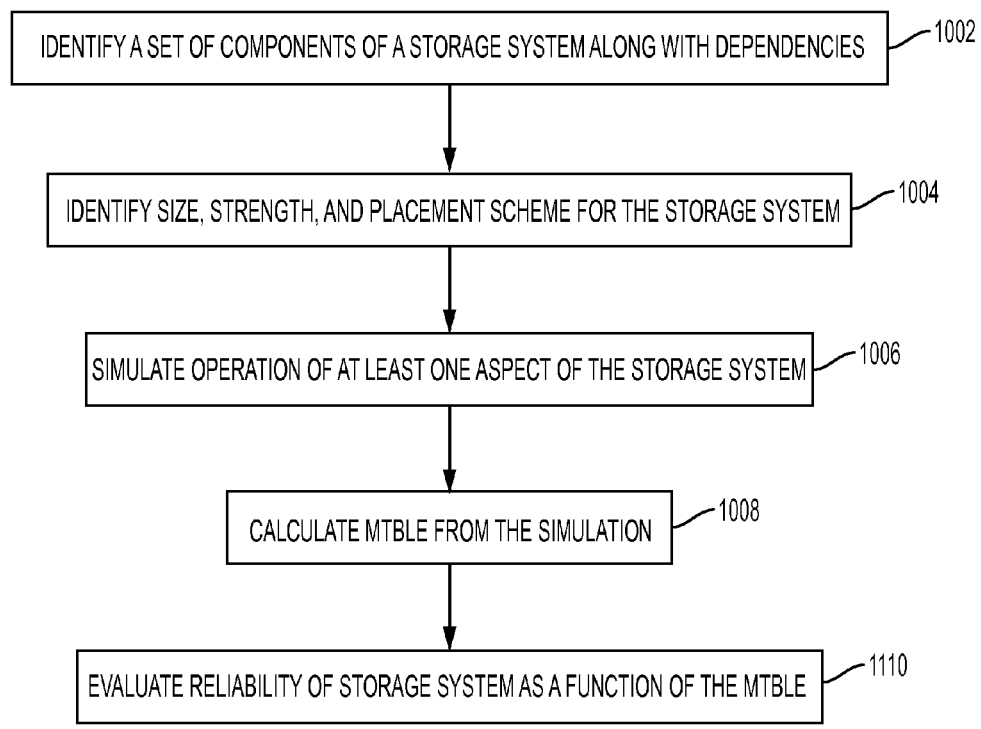
FIG. 10 is a flow diagram of a process for implementing a simulated storage system in accordance with an embodiment.

Turning now to FIG. 10, a flow diagram for implementing predicting reliability of a large scale storage system will now be described. At step 1002, a set of components of a storage system under design or currently deployed is identified. At least one of the component's ability to function is dependent on the ability of another component in the set to function. The components include any combination and number of data storage components, computation components, and datacenters.

At step 1004, a size, strength, and placement scheme is identified for the storage system. At step 1006, the operation of at least one aspect of the storage system is simulated based on the size, strength, and placement scheme.

At step 1008, a MTBLE is calculated from the simulation. The MTBLE factors in dependencies identified among the set of components. At block 1110, the reliability of the storage system is evaluated as a function of the MTBLE.

Figure 11:
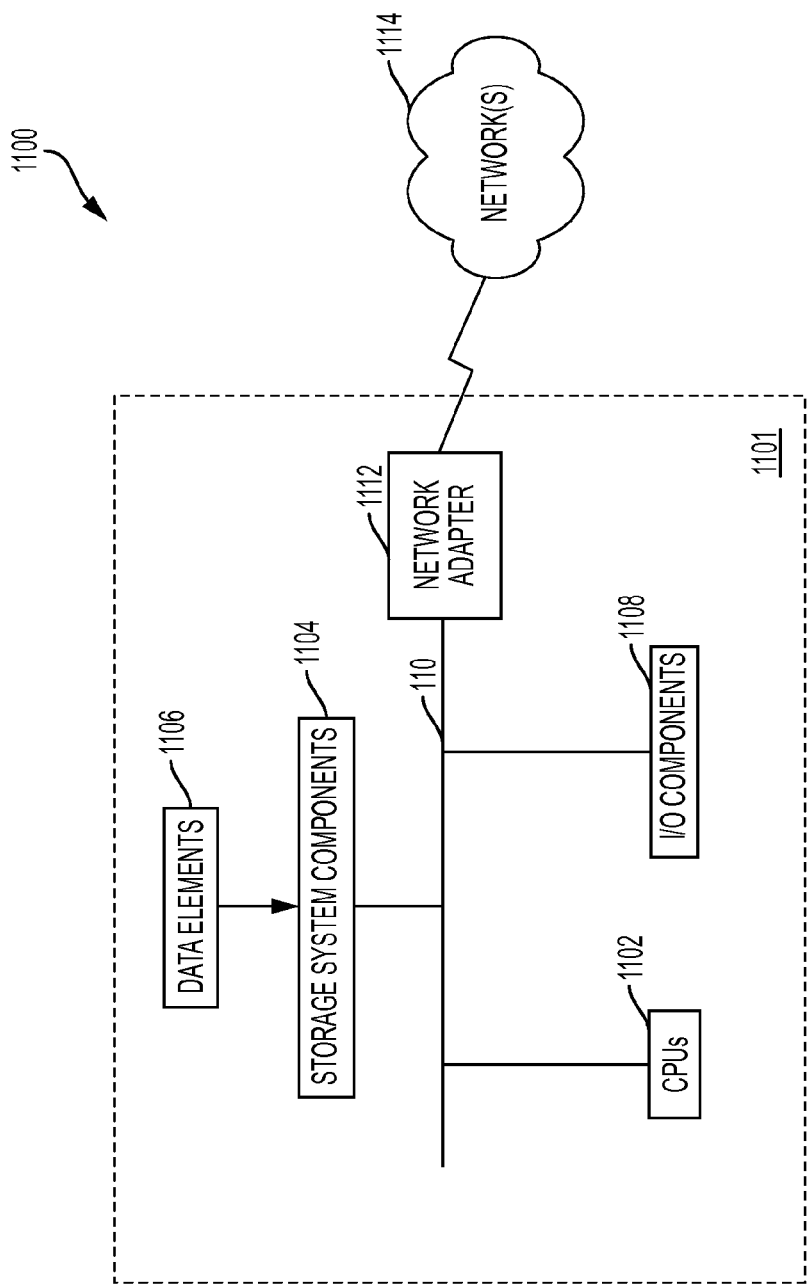
FIG. 11 is a system for implementing simulated storage systems in accordance with an embodiment.

Turning now to FIG. 11, there is shown an embodiment of a system 1100 for implementing the teachings herein. In this embodiment, the system 1100 includes a processing system 1101 communicatively to one or more networks 1114 via a network adapter 1112. The networks 1114 may include any type of known networks. In an embodiment, the networks 114 may include one or more of Ethernet, fiber channel, and wireless networks.

The processing system 1101 includes one or more central processing units (processors) 1102 (collectively or generically referred to as processor(s)). Processors 1102 are coupled to various components via a system bus 1110. In an embodiment, these various components include storage system components 1104 and input/output (I/O) components 1108.

The storage system components 1104 may include, by way of non-limiting examples, solid state storage devices, non-volatile storage devices, optical disk-based storage devices, RAM-based storage devices, and memristors. Non-limiting examples of I/O components 1108 include, e.g., keyboard, mouse, speakers, and a display.

Software for execution on processing system 1101 may be stored in a storage system component 1104. In an embodiment, the storage system component 1104 may also store data, big data, objects, blocks, and filesystems. The storage system components 1104 provide examples of tangible storage mediums readable by the processors 1102, where the software is stored as instructions for execution by the processors 1102 to perform, e.g., the process described in FIG. 10. The network adapter 1112 interconnects system bus 1110 with outside networks 1114 thereby enabling the processing system 1101 to communicate with other systems or network nodes.

In one embodiment, a portion of storage system components 1104 store an operating system to coordinate the functions of the various components shown in FIG. 11. It will be understood that the processing system 1101 may be running a cloud operating system, such as OpenStack, which includes virtual machines, logical volumes, and software defined networks.

As described above, the exemplary embodiments can be in the form of processor-implemented processes and devices for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes a device for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed is:

1. A method, comprising:
   identifying a set of components of a storage system;
   determining dependencies among components in the set of components, wherein at least one of the components' ability to function is dependent on at least one other of the components' ability to function, the set of components including at least one data storage component and at least one computation component, each of which is configured to operate within at least one datacenter;
   identifying a size, strength, and storage placement scheme of the storage system;
   simulating, via computer processor, operation of the storage system based on the identified size, strength, and placement scheme;
   determining a mean time between loss event from the simulated operation, the mean time between loss event factoring in the dependencies among the components; and
   assessing reliability of the storage system as a function of the mean time between loss event.

2. The method of claim 1, wherein the size of the storage system is determined by one of a total number of data storage components in the storage system, a total byte capacity of the storage system, and a total byte capacity of the storage system excluding redundancy overhead.

3. The method of claim 1, wherein the strength of the storage system is a function of its redundancy scheme, the redundancy scheme comprising one of error correction-based redundancy and replication-based redundancy.

4. The method of claim 1, wherein the storage placement scheme is one of spread placement, partitioned placement, limited spread placement, one per rack placement, and copyset placement.

5. The method of claim 1, wherein simulating the operation of the storage system includes simulating operation of the at least one data storage component, the at least one computation component, and at least one rack within the datacenter.

6. The method of claim 1, wherein the mean time between loss event is computed by using a component failure rate in combination with a component repair rate.

7. The method of claim 1, wherein the storage system is determined to be reliable if the mean time between loss event is not below a specified time value.

8. A system, comprising:
a computer processing device; and
memory comprising computer-executable instructions, that when executed by the computer processing device, cause the computer processing device to perform operations, the operations comprising:
identifying a set of components of a storage system;
determining dependencies among components in the set of components, wherein at least one of the components' ability to function is dependent on at least one other of the components' ability to function, the set of components including at least one data storage component and at least one computation component, each of which is configured to operate within at least one datacenter;
identifying a size, strength, and storage placement scheme of the storage system;
simulating operation of the storage system based on the identified size, strength, and placement scheme;
determining a mean time between loss event from the simulated operation, the mean time between loss event factoring in the dependencies among the components; and
assessing reliability of the storage system as a function of the mean time between loss event.

9. The system of claim 8, wherein the size of the storage system is determined by one of a total number of data storage components in the storage system, a total byte capacity of the storage system, and a total byte capacity of the storage system excluding redundancy overhead.

10. The system of claim 8, wherein the strength of the storage system is a function of its redundancy scheme, the redundancy scheme comprising one of error correction-based redundancy and replication-based redundancy.

11. The system of claim 8, wherein the storage placement scheme is one of spread placement, partitioned placement, limited spread placement, one per rack placement, and copyset placement.

12. The system of claim 8, wherein simulating the operation of the storage system includes simulating operation of the at least one data storage component, the at least one computation component, and at least one rack within the datacenter.

13. The system of claim 8, wherein the mean time between loss event is computed by using a component failure rate in combination with a component repair rate.

14. The system of claim 8, wherein the storage system is determined to be reliable if the mean time between loss event is not below a specified time value.

15. A computer program product tangibly embodied on a non-transitory computer readable medium, the computer program product including instructions that, when executed by a processor, cause the processor to perform operations comprising:
identifying a set of components of a storage system;
determining dependencies among components in the set of components, wherein at least one of the components' ability to function is dependent on at least one other of the components' ability to function, the set of components including at least one data storage component and at least one computation component, each of which is configured to operate within at least one datacenter;
identifying a size, strength, and storage placement scheme of the storage system;
simulating operation of the storage system based on the identified size, strength, and placement scheme;
determining a mean time between loss event from the simulated operation, the mean time between loss event factoring in the dependencies among the components; and
assessing reliability of the storage system as a function of the mean time between loss event.

16. The computer program product of claim 15, wherein the size of the storage system is determined by one of a total number of data storage components in the storage system, a total byte capacity of the storage system, and a total byte capacity of the storage system excluding redundancy overhead.

17. The computer program product of claim 15, wherein the strength of the storage system is a function of its redundancy scheme, the redundancy scheme comprising one of error correction-based redundancy and replication-based redundancy.

18. The computer program product of claim 15, wherein the storage placement scheme is one of spread placement, partitioned placement, limited spread placement, one per rack placement, and copyset placement.

19. The computer program product of claim 15, wherein simulating the operation of the storage system includes simulating operation of the at least one data storage component, the at least one computation component, and at least one rack within the datacenter.

20. The computer program product of claim 15, wherein the mean time between loss event is computed by using a component failure rate in combination with a component repair rate.

* * * * *